(12) United States Patent
Li et al.

(10) Patent No.: US 11,018,748 B2
(45) Date of Patent: May 25, 2021

(54) SYSTEMS AND METHODS FOR L1-RSRP MEASUREMENT ACCURACY FOR BEAM DETECTION

(71) Applicant: APPLE INC., Cupertino, CA (US)

(72) Inventors: Hua Li, Beijing (CN); Yang Tang, Santa Clara, CA (US); Jie Cui, Santa Clara, CA (US); Shuang Tian, Santa Clara, CA (US); Yuhan Zhou, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/009,062

(22) Filed: Sep. 1, 2020

(65) Prior Publication Data

US 2020/0395994 A1    Dec. 17, 2020

Related U.S. Application Data

(62) Division of application No. 16/410,498, filed on May 13, 2019, now Pat. No. 10,790,896.

(60) Provisional application No. 62/671,339, filed on May 14, 2018.

(51) Int. Cl.
*H04B 7/06* (2006.01)

(52) U.S. Cl.
CPC ......... *H04B 7/0695* (2013.01); *H04B 7/0626* (2013.01)

(58) Field of Classification Search
CPC .... H04B 7/0617; H04B 7/063; H04B 7/0634; H04B 7/0626; H04B 7/0695

USPC ........................................................ 375/267
See application file for complete search history.

(56) References Cited

U.S. PATENT DOCUMENTS

| 2013/0223251 | A1* | 8/2013 | Li | H04B 7/0619 |
| | | | | 370/252 |
| 2019/0207667 | A1* | 7/2019 | Zhou | H04B 7/0626 |
| 2019/0253127 | A1 | 8/2019 | Kang et al. | |
| 2020/0099488 | A1* | 3/2020 | Kim | H04B 7/0456 |

OTHER PUBLICATIONS

U.S. Appl. No. 16/410,498, Notice of Allowance, dated Jun. 1, 2020, 14 pages.
3GPP TS 38.133, "3rd Generation Partnership Project; Technical Specification Group Radio Access Network; NR; Requirements for support of radio resource management (Release 15)", V15.1.0, Mar. 2018, 59 pages.

* cited by examiner

*Primary Examiner* — Ted M Wang
(74) *Attorney, Agent, or Firm* — Stoel Rives LLP

(57) ABSTRACT

Systems and methods provide for beam detection in a wireless communication system. An apparatus for a UE may be configured to identify a plurality of CSI-RS resources corresponding to different Tx beams configured for measurement by the UE, measure an L1-RSRP for the plurality of CSI-RS resources, determine a selected Tx beam of the different Tx beams based on measured L1-RSRP values for the plurality of CSI-RS resources, and determine a measurement accuracy of a first L1-RSRP value corresponding to the selected Tx beam based on successful beam detection probability.

12 Claims, 13 Drawing Sheets

SYSTEMS AND METHODS FOR L1-RSRP MEASUREMENT ACCURACY FOR BEAM DETECTION

CROSS-REFERENCE TO RELATED APPLICATION(S)

This application is a divisional of U.S. patent application Ser. No. 16/410,498, filed May 13, 2019, which claims the benefit under 35 U.S.C. § 119(e) of U.S. Provisional Application No. 62/671,339 filed May 14, 2018, which is hereby incorporated by reference herein in its entirety.

TECHNICAL FIELD

This application relates generally to wireless communication systems, and more specifically to L1-RSRP measurement accuracy for beam detection.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
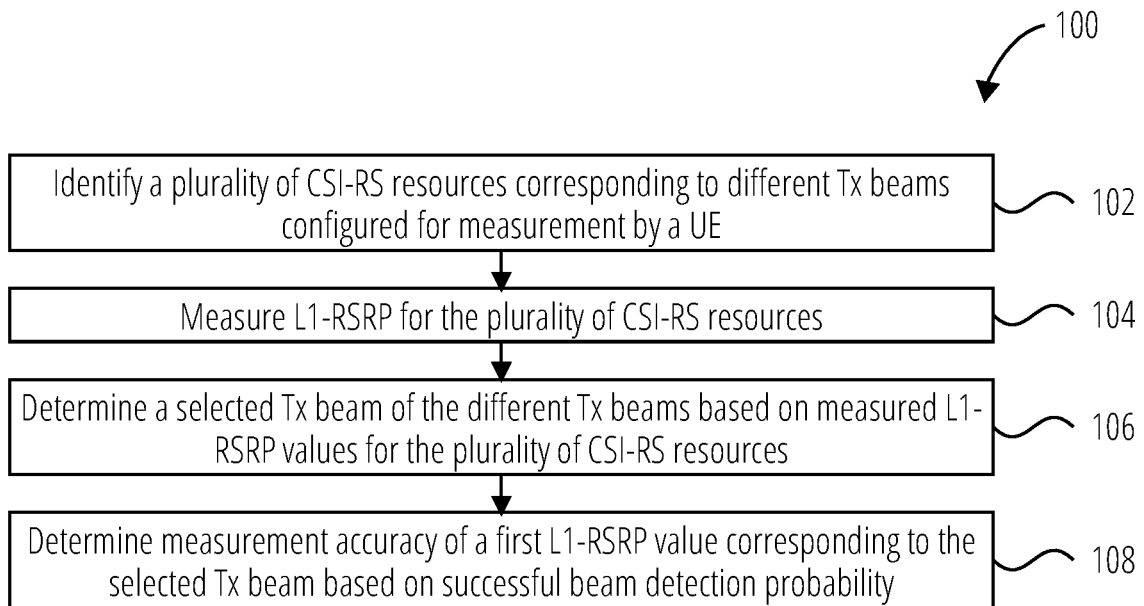
FIG. 1 illustrates a method for beam detection by a UE in a wireless communication system in accordance with one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

For Layer 1 (L1)-Reference Signal Received Power (RSRP) reporting, companies are encouraged to investigate whether measurement period of L1-RSRP needs to be specified and whether this will be part of core requirements or performance part; whether L1-RSRP measurement accuracy is a performance part; and for future study (FFS) whether L1-RSRP core and performance requirements are to be specified. One issue is that the definition of the L1-RSRP measurement accuracy and period for beam detection are not clear. Embodiments herein define the L1-RSRP measurement accuracy based on successful beam detection probability.

L1-RSRP can be used for beam detection. Different from its use in mobility, L1-RSRP measurement accuracy is useful for beam detection because it is used to decide whether the beam selection is correct or not. If the accuracy is not guaranteed, a wrong beam may be chosen. However, how to define the L1-RSRP measurement accuracy is not clear. Until now, there has been no direct relationship between the measurement accuracy and beam detection probability. In addition to a discussion of measurement accuracy and period, further discussion to determine how to make use of the L1-RSRP report for beam detection. Certain embodiments herein define measurement accuracy based on the successful beam detection probability. In certain such embodiments, a beam detection probability is selected to be more than 90%.

An example procedure according to various embodiments may be as follows: when there are several channel state information reference signal (CSI-RS) resources corresponding to different transmission (Tx) beams, a user equipment (UE) may measure the L1-RSRP for each Tx beam and choose the best one. The UE may compare the chosen Tx beam with an "ideal" Tx beam in a period and may calculate the successful beam detection probability. The UE may make sure that the successful beam detection probability is larger than about 90%.

To define the measurement accuracy, there are several aspects that may need consideration, such as sample number, Tx beam configuration, and CSI-RS density.

A. SAMPLE NUMBER

Depending on the density of CSI-RS, measurement bandwidth, Doppler and numerology, the L1-RSRP estimation accuracy may not be guaranteed by single sample. Certain embodiments herein perform averaging between samples to help improve the measurement accuracy.

One sample or multiple samples can be used to calculate the L1-RSRP for different Tx beams. In one embodiment, for example, if L1-RSRP based on a single sample does not achieve a beam detection probability that is greater than about 90%, multiple samples are used to improve the estimation accuracy. The exact sample number may be determined through simulation. The measurement accuracy may then be defined based by the sample number. Similar with other RSRP requirements, for example, by plotting the cumulative distribution function (CDF) of an RSRP measurement accuracy curve, the maximum RSRP delta corresponding to 5% and 95% of the curve can be defined.

B. Tx BEAM CONFIGURATION

The Tx beam pattern may have an impact on the beam detection probability. If a Tx beam has high correlation and the beam direction of the various Tx beams are close to one another, it may be more difficult to distinguish the best beam. In certain embodiments, Tx beams are equally sampled in the spatial domain. For example, Tx beam direction is equally divided by /N where N is the Tx beam number. In addition, or in other embodiments, another simplified method with different power boosting is provided for different Tx beams since the beamforming gain can be equal to effective signal-to-noise ratio (SNR) to some extent. For example, for four Tx beams, the power boosting for different Tx beams can be OdB, 2 dB, 4 dB, 5 dB.

C. CSI-RS DENSITY (D)

The CSI-RS resources configured for L1-RSRP measurement may be transmitted corresponding to a number of resource element (RE) per resource block (RB) per port. From simulation results, the inventors have observed that increasing the density may improve measurement accuracy. For example, the L1-RSRP accuracy may degrade in extended typical urban (ETU) channel compared with an extended pedestrian A (EPA) channel. Also, the L1-RSRP accuracy based on a density of D=1 performs much worse than that based on D=3 in an ETU channel for both 24 RB and 96 RB. As a further example, for 24 RB with D=1, the worst L1-RSRP accuracy may be 4.5 dB for one sample, which is larger than 2.5 dB with five samples at an SNR=0 dB in an ETU channel.

Based on these observations, various embodiments herein define a density of D=3 as the baseline for CSI-RS based L1-RSRP reporting. In other embodiments, a density three or great may be used.

D. EXAMPLE METHOD EMBODIMENTS

FIG. 1 illustrates a method 100 for beam detection by a UE in a wireless communication system in accordance with one embodiment. In block 102, method 100 identifies a plurality of channel state information reference signal (CSI-RS) resources corresponding to different transmit (Tx) beams configured for measurement by the UE. In block 104, method 100 measures a layer one reference signal received power (L1-RSRP) for the plurality of CSI-RS resources. In block 106, method 100 determines a selected Tx beam of the different Tx beams based on measured L1-RSRP values for the plurality of CSI-RS resources. In block 108, method 100 determines a measurement accuracy of a first L1-RSRP value corresponding to the candidate Tx beam based on successful beam detection probability.

In certain embodiments, the CSI-RS resources configured for L1-RSRP measurement are transmitted with a density of three or more RE/RB/per port. In addition, or in other embodiments, measuring the L1-RSRP for the plurality of CSI-RS resources comprises measuring three samples of the L1-RSRP for each of the plurality CSI-RS resources. The method may also include averaging the three samples corresponding to each of the plurality of CSI-RS resources.

In certain embodiments, determining the selected Tx beam includes; determining a largest L1-RSRP of the measured L1-RSRP values for the plurality of CSI-RS resources, the largest L1-RSRP corresponding to a candidate Tx beam; comparing the candidate Tx beam to a predetermined Tx beam in a measurement period; and based on the comparison, calculating the successful beam detection probability.

Figure 2:
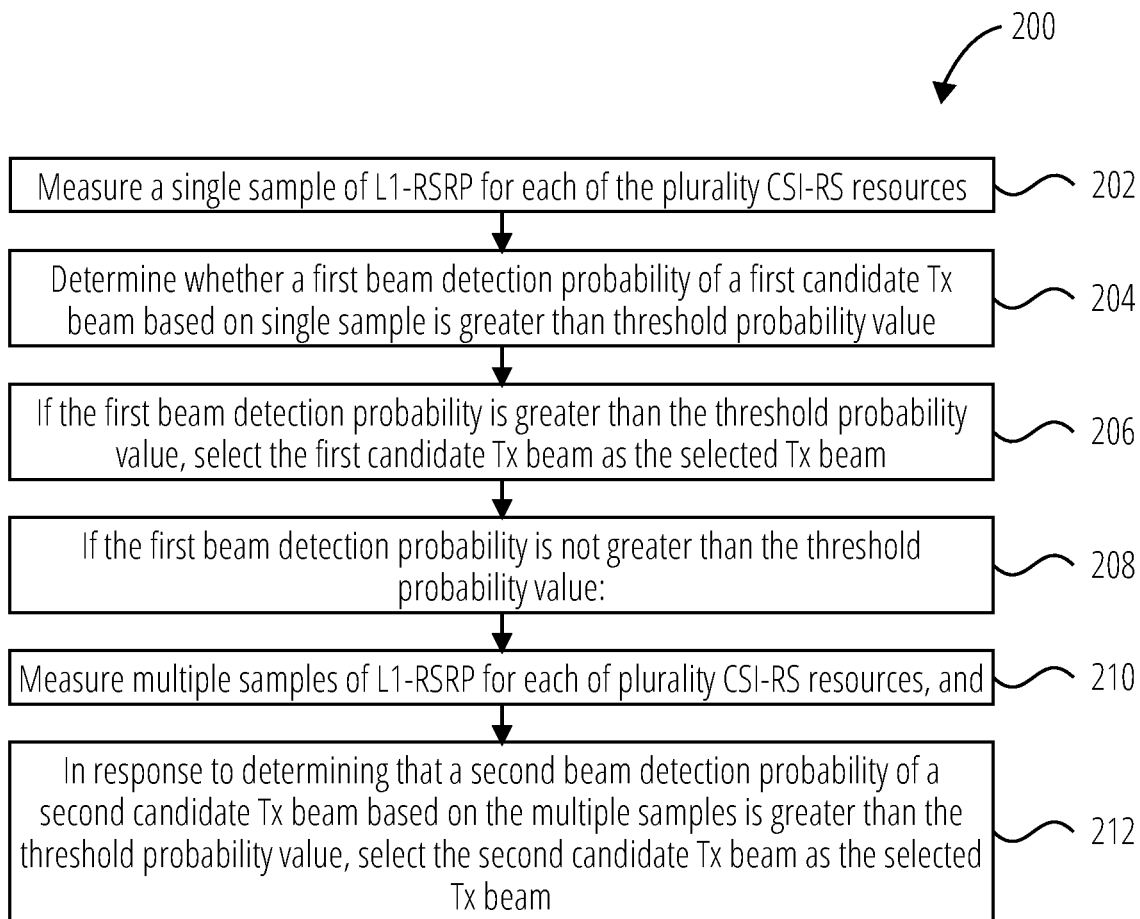
FIG. 2 illustrates a method in accordance with one embodiment.

FIG. 2 illustrates a method 200 in accordance with one embodiment. In block 202, method 200 measures a single sample of L1-RSRP for each of the plurality CSI-RS resources. In block 204, method 200 determines whether a first beam detection probability of a first candidate Tx beam based on the single sample is greater than a threshold probability value. In block 206, if the first beam detection probability is greater than the threshold probability value, method 200 selects the first candidate Tx beam as the selected Tx beam. In block 208, on the other hand, if the first beam detection probability is not greater than the threshold probability value, in block 210 the method 200 measures multiple samples of L1-RSRP for each of the plurality CSI-RS resources, and in block 212 the method 200 in response to determining that a second beam detection probability of a second candidate Tx beam based on the multiple samples is greater than the threshold probability value, selects the second candidate Tx beam as the selected Tx beam. The threshold probability value may be about 90% or above. In certain embodiments, the multiple samples comprise three or more samples to achieve the successful beam detection probability.

Figure 3:
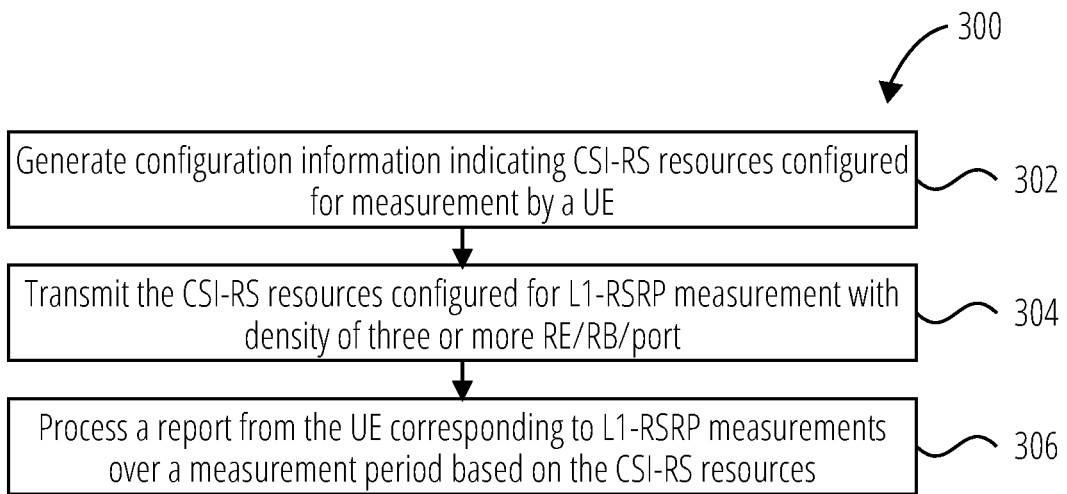
FIG. 3 illustrates a method for a node in a wireless network to configure CSI-RS reporting based on L1-RSRP in accordance with one embodiment.

FIG. 3 illustrates a method 300 for a node in a wireless network to configure CSI-RS reporting based on L1-RSRP in accordance with one embodiment. In block 302, method 300 generates configuration information indicating CSI-RS resources configured for measurement by a UE. In block 304, method 300 transmits the CSI-RS resources configured for L1-RSRP measurement with a density of three or more resource element (RE) per resource block (RB) per port. In block 306, method 300 processes a report from the UE corresponding to L1-RSRP measurements over a measurement period based on the CSI-RS resources.

In certain embodiments, method 300 further includes configuring the UE to average at least three samples of the L1-RSRP for each of the plurality of CSI-RS resources. In addition, or in other embodiments, method 300 includes providing a Tx beam configuration wherein Tx beams corresponding to the CSI RS resources are equally sampled in a spatial domain. For example, method 300 may include equally dividing Tx beam directions of the Tx beams by 360°/N, where N is a Tx beam number. In certain embodiments, method 300 further includes instructing the UE to perform CSI-RS based candidate beam detection with a successful beam detection probability of more than 90%.

E. BEAM MANAGEMENT

In new radio (NR) implementations, beam management may refer to a set of L1/L2 procedures to acquire and maintain a set of TRP(s) and/or UE beams that can be used for downlink (DL) and uplink (UL) transmission/reception, which may include beam determination, which may refer to TRxP(s) or UE ability to select of its own transmission (Tx)/reception (Rx) beam(s); beam measurement, which may refer to transmission/reception point(s) (TRP or TRxP) or UE ability to measure characteristics of received beamformed signals; beam reporting, which may refer the UE ability to report information of beamformed signal(s) based on beam measurement; and beam sweeping, which may refer to operation(s) of covering a spatial area, with beams transmitted and/or received during a time interval in a predetermined manner.

Tx/Rx beam correspondence at a TRxP holds if at least one of the following conditions are satisfied: TRxP is able to determine a TRxP Rx beam for the uplink reception based on UE's downlink measurement on TRxP's one or more Tx beams; and TRxP is able to determine a TRxP Tx beam for the downlink transmission based on TRxP's uplink measurement on TRxP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRxP's indication based on uplink measurement on UE's one or more Tx beams; and Capability indication of UE beam correspondence related information to TRxP is supported.

In some implementations, DL beam management may include procedures P-1, P-2, and P-3. Procedure P-1 may be used to enable UE measurement on different TRxP Tx beams to support selection of TRxP Tx beams/UE Rx beam(s). For beamforming at TRxP, procedure P-1 typically includes a intra/inter-TRxP Tx beam sweep from a set of different beams. For beamforming at the UE, procedure P-1 typically includes a UE Rx beam sweep from a set of different beams.

Procedure P-2 may be used to enable UE measurement on different TRxP Tx beams to possibly change inter/intra-TRxP Tx beam(s). Procedure P-2 may be a special case of procedure P-1 wherein procedure P-2 may be used for a possibly smaller set of beams for beam refinement than procedure P-1. Procedure P-3 may be used to enable UE measurement on the same TRxP Tx beam to change UE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE may report measurement results of N selected Tx beams (where N may or may not be a fixed number). The procedure based on RS for mobility purpose is not precluded. Beam information that is to be reported may include measurement quantities for the N beam(s) and information indicating N DL Tx beam(s), if N<K. Other information or data may be included in or with the beam information. When a UE is configured with K'>1 non-zero power (NZP) CSI-RS resources, a UE can report N' CSI-RS Resource Indicator (CRIs).

In some NR implementations, a UE can trigger a mechanism to recover from beam failure, which may be referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism may be triggered when beam failure occurs. The network may explicitly configure the UE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a UE) different from PRACH. Transmission of DL signal is supported for allowing the UE to monitor the beams for identifying new potential beams.

For beam failure recovery, a beam failure should be declared if all the serving PDCCH beams fail. The beam failure recovery request procedure may be initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the UE.

In some implementations, beam management may include providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications may be based on a Transmission Configuration Indication (TCI) state(s). The TCI state(s) may be indicated in a TCI list that is configured by radio resource control (RRC) and/or Media Access Control (MAC) Control Element (CE). In some implementations, a UE can be configured up to M TCI-States by higher layer signaling to decode PDSCH according to a detected PDCCH with downlink control information (DCI) intended for the UE and the given serving cell where M depends on the UE capability. Each configured TCI state includes one reference signal (RS) set TCI-RS-SetConfig. Each TCI-RS-SetConfig may include parameters for configuring quasi co-location relationship(s) between the RSs in the RS set and the demodulation reference signal (DM-RS) port group of the PDSCH. The RS set may include a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial Rx parameter}.

The UE may receive a selection command (e.g., in a MAC CE), which may be used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set (q0) of periodic CSI-RS resource configuration indexes by higher layer parameter Beam-Failure-Detection-RS-ResourceConfig and with a set (q1) of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE may determine set (q0) to include SS/PBCH blocks and periodic CSI-RS configurations with same values for higher layer parameter TCI-StatesPDCCH as for control resource sets (CORESET) that the UE is configured for monitoring PDCCH.

The physical layer of a UE may assess the radio link quality according to a set of resource configurations against a threshold $Q_{out,LR}$. The threshold $Q_{out,LR}$ corresponds to a default value of higher layer parameter RLM-IS-OOS-thresholdConfig and Beam-failure-candidate-beam-threshold, respectively. For the set (q0), the UE may assess the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

In some implementations, if a beam failure indication has been received by a MAC entity from lower layers, then the MAC entity may start a beam failure recovery timer (beamFailureRecoveryTimer) and initiate a Random Access procedure. If the beamFailureRecoveryTimer expires, then the MAC entity may indicate a beam failure recovery request failure to upper layers. If a downlink assignment or uplink grant has been received (e.g., on a PDCCH addressed for a cell radio network temporary identifier (C-RNTI)), then the MAC entity may stop and reset beamFailureRecovery-Timer and consider the beam failure recovery request procedure to be successfully completed.

F. BEAM MEASUREMENT

In embodiments, a UE (e.g., in RRC_CONNECTED mode) may measure multiple beams (at least one) of a cell and the measurements results (power values) are averaged to derive the cell quality. The UE may be configured to consider a subset of the detected beams, such as the N best beams above an absolute threshold. Filtering may take place at two different levels include at the physical layer (PHY) to derive beam quality and then at the RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB. For channel state estimation purposes, the UE may be configured to measure CSI-RS resources and estimate a downlink channel state based on the CSI-RS measurements. The UE may feed the estimated channel state back to the gNB to be used in link adaptation.

Figure 4:
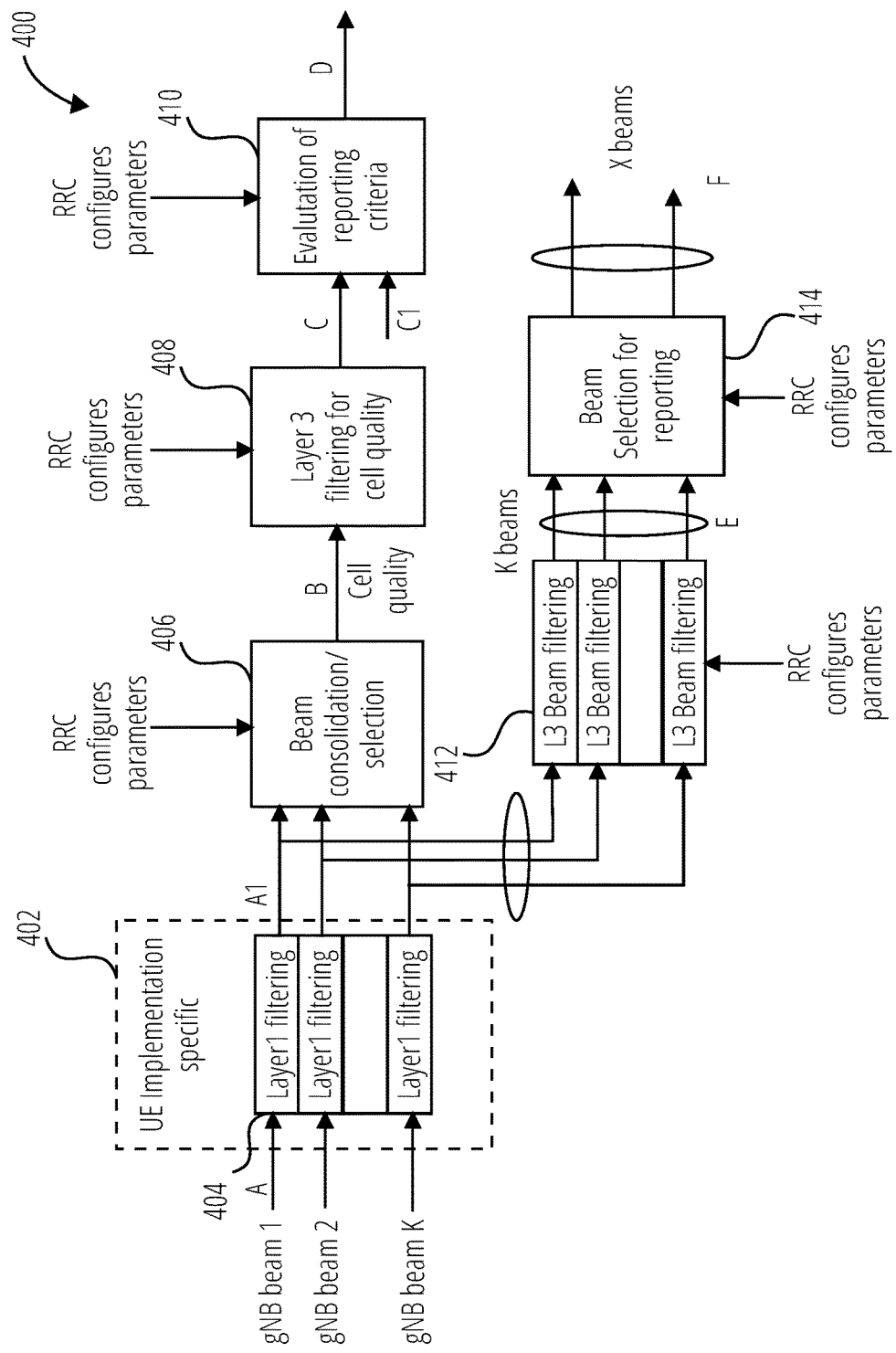
FIG. 4 illustrates an example beam measurement model in accordance with one embodiment.

An example beam measurement model 400 is shown by FIG. 4. The example beam measurement model 400 includes UE implementation specific circuitry 402, L1 filtering circuitry 404, beam consolidation/selection circuitry 406, L3 filtering for cell quality circuitry 408, evaluation of reporting criteria circuitry 410, L3 beam filtering circuitry 412, and beam selection for reporting circuitry 414. In FIG. 4, point A may include measurements (e.g., beam specific samples) internal to the PHY. Layer 1 (L1) filtering may include internal L1 filtering circuitry 404 for filtering the inputs measured at point A. The exact filtering mechanisms and how the measurements are actually executed at the PHY may be implementation specific. The measurements (e.g., beam specific measurements) may be reported by the L1 filtering circuitry 404 to the L3 beam filtering circuitry 412 and the beam consolidation/selection circuitry 406 at point A1.

The beam consolidation/selection circuitry 406 may include circuitry where beam specific measurements are consolidated to derive cell quality. For example, if N>1, else when N=1 the best beam measurement may be selected to derive cell quality. The configuration of the beam may be provided by RRC signaling. A measurement (e.g., cell quality) derived from the beam-specific measurements may then be reported to L3 filtering for cell quality circuitry 408 after beam consolidation/selection. In some embodiments, the reporting period at point B may be equal to one measurement period at point A1.

The L3 filtering for cell quality circuitry 408 may be configured to filter the measurements provided at point B. The configuration of the Layer 3 filters may be provided by the aforementioned RRC signaling or different/separate RRC signaling. In some embodiments, the filtering reporting period at point C may be equal to one measurement period at point B. A measurement after processing in the L3 filtering for cell quality circuitry 408 may be provided to the evaluation of reporting criteria circuitry 410 at point C. In some embodiments, the reporting rate may be identical to the reporting rate at point B. This measurement input may be used for one or more evaluation of reporting criteria.

The evaluation of reporting criteria circuitry 410 may be configured to check whether actual measurement reporting is necessary at point D. The evaluation can be based on more than one flow of measurements at reference point C. In one example, the evaluation may involve a comparison between different measurements, such as a measurement provided at point C and another measurement provided at point C1. In embodiments, the UE may evaluate the reporting criteria at least every time a new measurement result is reported at point C, C1. The reporting criteria configuration may be provided by the aforementioned RRC signaling (UE measurements) or different/separate RRC signaling. After the evaluation, measurement report information (e.g., as a message) may be sent on the radio interface at point D.

Referring back to point A1, measurements provided at point A1 may be provided to the L3 beam filtering circuitry 412, which may be configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at A1. The K beams may correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement may be provided to the beam selection for reporting circuitry 414 at point E. This measurement may be used as an input for selecting the X measurements to be reported. In embodiments, the reporting rate may be identical to the reporting rate at point A1. The beam selection for reporting circuitry 414 may be configured to select the X measurements from the measurements provided at point E. The configuration of this module may be provided by the aforementioned RRC signaling or different/separate RRC signaling. The beam measurement information to be included in a measurement report may be sent or scheduled for transmission on the radio interface at point F.

The measurement reports may include a measurement identity of an associated measurement configuration that triggered the reporting. The measurement reports may include cell and beam measurement quantities to be included in measurement reports that are configured by the network (e.g., using RRC signaling). The measurement reports may include number of non-serving cells to be reported can be limited through configuration by the network. Cell(s) belonging to a blacklist configured by the network may not be used in event evaluation and reporting. By contrast, when a whitelist is configured by the network, only the cells belonging to the whitelist may be used in event evaluation and reporting. The beam measurements to be included in measurement reports may be configured by the network, and such measurement reports may include or indicate a beam identifier only, a measurement result and beam identifier, or no beam reporting.

G. EXAMPLE EMBODIMENTS

Figure 5:
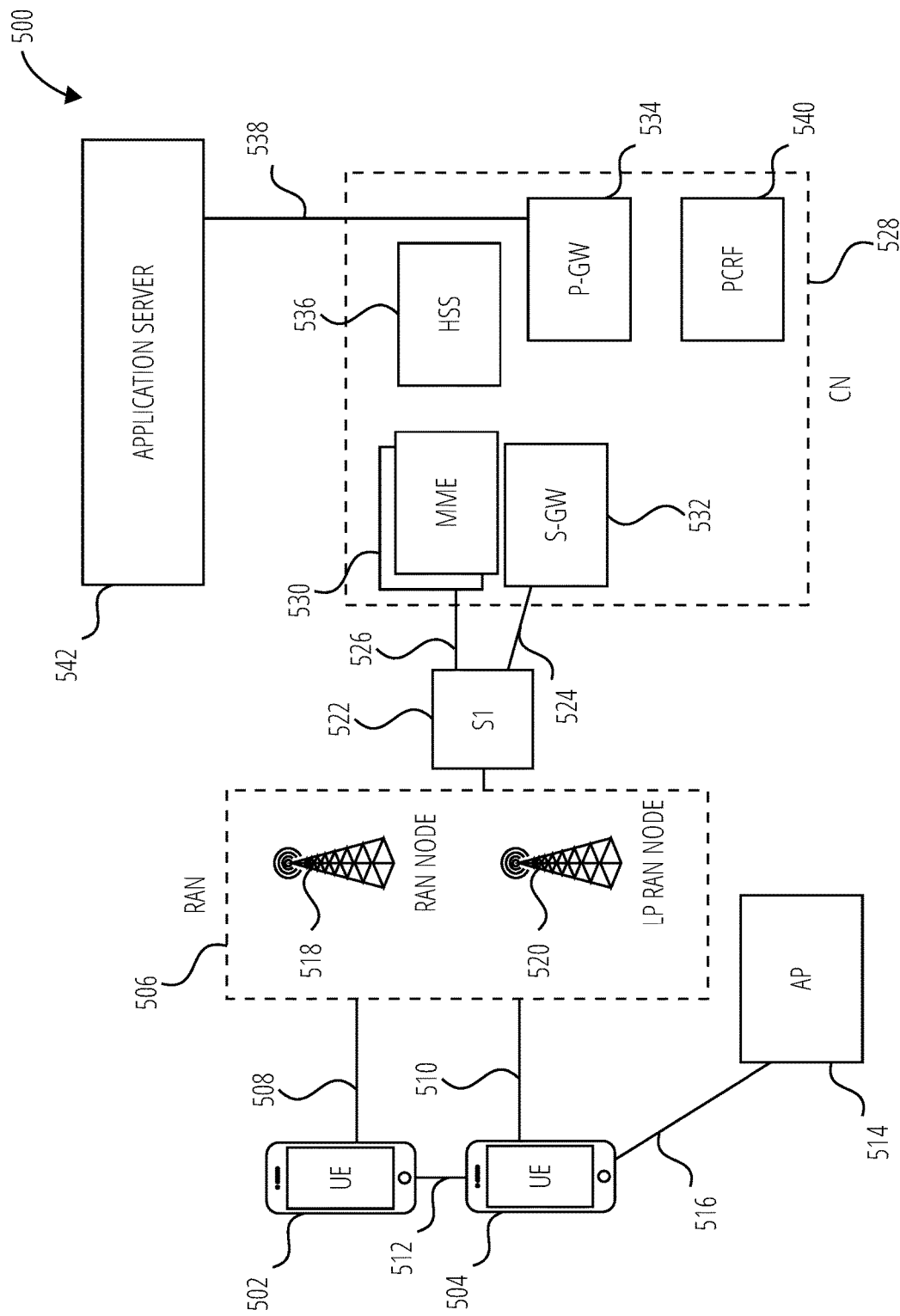
FIG. 5 illustrates a system in accordance with one embodiment.

FIG. 5 illustrates an architecture of a system 500 of a network in accordance with some embodiments. The system 500 includes one or more user equipment (UE), shown in this example as a UE 502 and a UE 504. The UE 502 and the UE 504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 502 and the UE 504 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and the UE 504 may be configured to connect, e.g., communicatively couple, with a radio access network (RAN), shown as RAN 506. The RAN 506 may be, for example, an Evolved Universal Mobile Telecommunications System (UMTS) Terrestrial Radio Access Network (E-UTRAN), a NextGen RAN (NG RAN), or some other type of RAN. The UE 502 and the UE 504 utilize connection 508 and connection 510, respectively, each of which comprises a physical communications interface or layer (discussed in further detail below); in this example, the connection 508 and the connection 510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 502 and the UE 504 may further directly exchange communication data via a ProSe interface 512. The ProSe interface 512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 504 is shown to be configured to access an access point (AP), shown as AP 514, via connection 516. The connection 516 can comprise a local wireless connection, such as a connection consistent with any IEEE 802.11 protocol, wherein the AP 514 would comprise a wireless fidelity (WiFi®) router. In this example, the AP 514 may be connected to the Internet without connecting to the core network of the wireless system (described in further detail below).

The RAN 506 can include one or more access nodes that enable the connection 508 and the connection 510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 506 may include one or more RAN nodes for providing macrocells, e.g., macro RAN node 518, and one or more RAN nodes for providing femtocells or picocells (e.g., cells having smaller coverage areas, smaller user capacity, or higher bandwidth compared to macrocells), e.g., a low power (LP) RAN node such as LP RAN node 520.

Any of the macro RAN node 518 and the LP RAN node 520 can terminate the air interface protocol and can be the first point of contact for the UE 502 and the UE 504. In some embodiments, any of the macro RAN node 518 and the LP RAN node 520 can fulfill various logical functions for the RAN 506 including, but not limited to, radio network controller (RNC) functions such as radio bearer management, uplink and downlink dynamic radio resource management and data packet scheduling, and mobility management.

In accordance with some embodiments, the UE 502 and the UE 504 can be configured to communicate using Orthogonal Frequency-Division Multiplexing (OFDM) communication signals with each other or with any of the macro RAN node 518 and the LP RAN node 520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 518 and the LP RAN node 520 to the UE 502 and the UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 502 and the UE 504. The physical downlink control channel (PDCCH) may carry information about the transport format and resource allocations related to the PDSCH channel, among other things. It may also inform the UE 502 and the UE 504 about the transport format, resource allocation, and H-ARQ (Hybrid Automatic Repeat Request) information related to the uplink shared channel. Typically, downlink scheduling (assigning control and shared channel resource blocks to the UE 504 within a cell) may be performed at any of the macro RAN node 518 and the LP RAN node 520 based on channel quality information fed back from any of the UE 502 and UE 504. The downlink resource assignment information may be sent on the PDCCH used for (e.g., assigned to) each of the UE 502 and the UE 504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 506 is communicatively coupled to a core network (CN), shown as CN 528—via an S1 interface 522. In embodiments, the CN 528 may be an evolved packet core (EPC) network, a NextGen Packet Core (NPC) network, or some other type of CN. In this embodiment the S1 interface 522 is split into two parts: the S1-U interface 524, which carries traffic data between the macro RAN node 518 and the LP RAN node 520 and a serving gateway (S-GW), shown as S-GW 532, and an S1-mobility management entity (MME) interface, shown as S1-MME interface 526, which is a signaling interface between the macro RAN node 518 and LP RAN node 520 and the MME(s) 530.

In this embodiment, the CN 528 comprises the MME(s) 530, the S-GW 532, a Packet Data Network (PDN) Gateway (P-GW) (shown as P-GW 534), and a home subscriber server (HSS) (shown as HSS 536). The MME(s) 530 may be similar in function to the control plane of legacy Serving General Packet Radio Service (GPRS) Support Nodes (SGSN). The MME(s) 530 may manage mobility aspects in access such as gateway selection and tracking area list management. The HSS 536 may comprise a database for network users, including subscription-related information to support the network entities' handling of communication sessions. The CN 528 may comprise one or several HSS 536, depending on the number of mobile subscribers, on the capacity of the equipment, on the organization of the network, etc. For example, the HSS 536 can provide support for routing/roaming, authentication, authorization, naming/addressing resolution, location dependencies, etc.

The S-GW 532 may terminate the S1 interface 322 towards the RAN 506, and routes data packets between the RAN 506 and the CN 528. In addition, the S-GW 532 may be a local mobility anchor point for inter-RAN node handovers and also may provide an anchor for inter-3GPP mobility. Other responsibilities may include lawful intercept, charging, and some policy enforcement.

The P-GW 534 may terminate an SGi interface toward a PDN. The P-GW 534 may route data packets between the CN 528 (e.g., an EPC network) and external networks such as a network including the application server 542 (alternatively referred to as application function (AF)) via an Internet Protocol (IP) interface (shown as IP communications interface 538). Generally, an application server 542 may be an element offering applications that use IP bearer resources with the core network (e.g., UMTS Packet Services (PS) domain, LTE PS data services, etc.). In this embodiment, the P-GW 534 is shown to be communicatively coupled to an application server 542 via an IP communications interface 538. The application server 542 can also be configured to support one or more communication services (e.g., Voice-over-Internet Protocol (VoIP) sessions, PTT sessions, group communication sessions, social networking services, etc.) for the UE 502 and the UE 504 via the CN 528.

The P-GW 534 may further be a node for policy enforcement and charging data collection. A Policy and Charging Enforcement Function (PCRF) (shown as PCRF 540) is the policy and charging control element of the CN 528. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 540 may be communicatively coupled to the application server 542 via the P-GW 534. The application server 542 may signal the PCRF 540 to indicate a new service flow and select the appropriate Quality of Service (QoS) and charging parameters. The PCRF 540 may provision this rule into a Policy and Charging Enforcement Function (PCEF) (not shown) with the appropriate traffic flow template (TFT) and QoS class of identifier (QCI), which commences the QoS and charging as specified by the application server 542.

Figure 6:
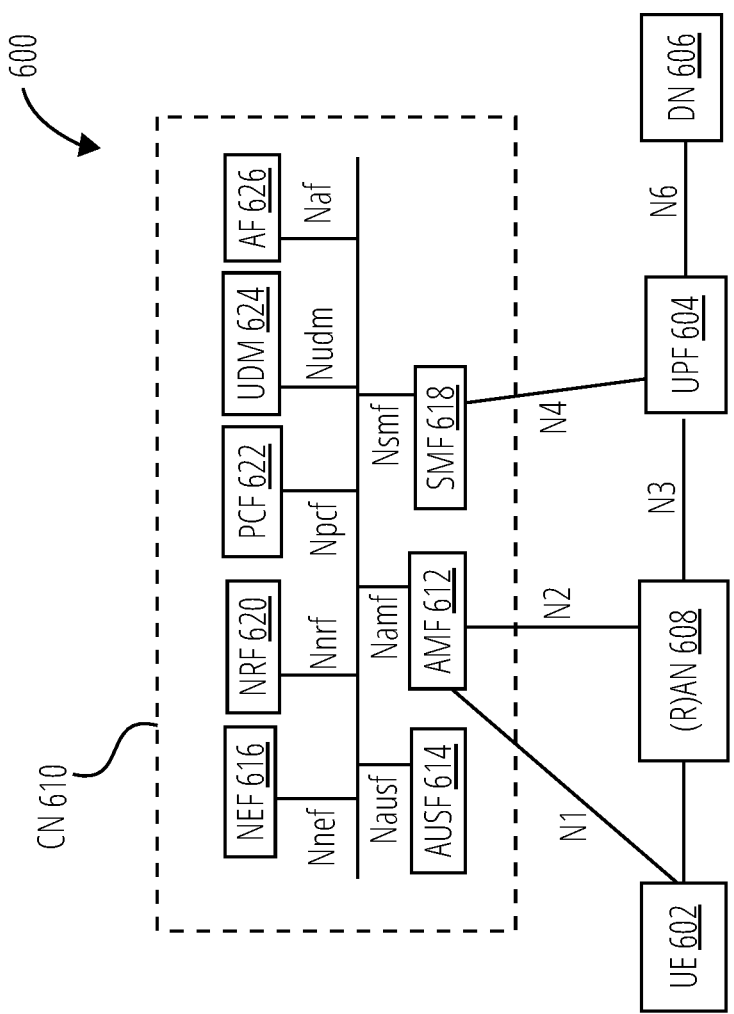
FIG. 6 illustrates a system in accordance with one embodiment.

FIG. 6 illustrates an architecture of a system 600 of a network in accordance with some embodiments. The system 600 is shown to include a UE 602, which may be the same or similar to the UE 502 and the UE 504 discussed previously; a 5G access node or RAN node (shown as (R)AN node 608), which may be the same or similar to the macro RAN node 518 and/or the LP RAN node 520 discussed previously; a User Plane Function (shown as UPF 604); a Data Network (DN 606), which may be, for example, operator services, Internet access or 3rd party services; and a 5G Core Network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services. DN 606 may include, or be similar to the application server 542 discussed previously.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (N1) signaling, and perform NAS ciphering and integrity protection.

AMF 612 may also support NAS signaling with a UE 602 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/ authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NFs.

As discussed previously, the CN 610 may include an SMSF, which may be responsible for SMS subscription checking and verification, and relaying SM messages to/from the UE 602 to/from other entities, such as an SMS-GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME (e.g., MME(s) 530) and the AMF 612 in order to enable interworking between CN 610 and CN 528.

Although not shown by FIG. 6, the system 600 may include multiple RAN nodes (such as (R)AN node 608) wherein an Xn interface is defined between two or more (R)AN node 608 (e.g., gNBs and the like) that connecting to 5GC 410, between a (R)AN node 608 (e.g., gNB) connecting to CN 610 and an eNB (e.g., a macro RAN node 518 of FIG. 5), and/or between two eNBs connecting to CN 610.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
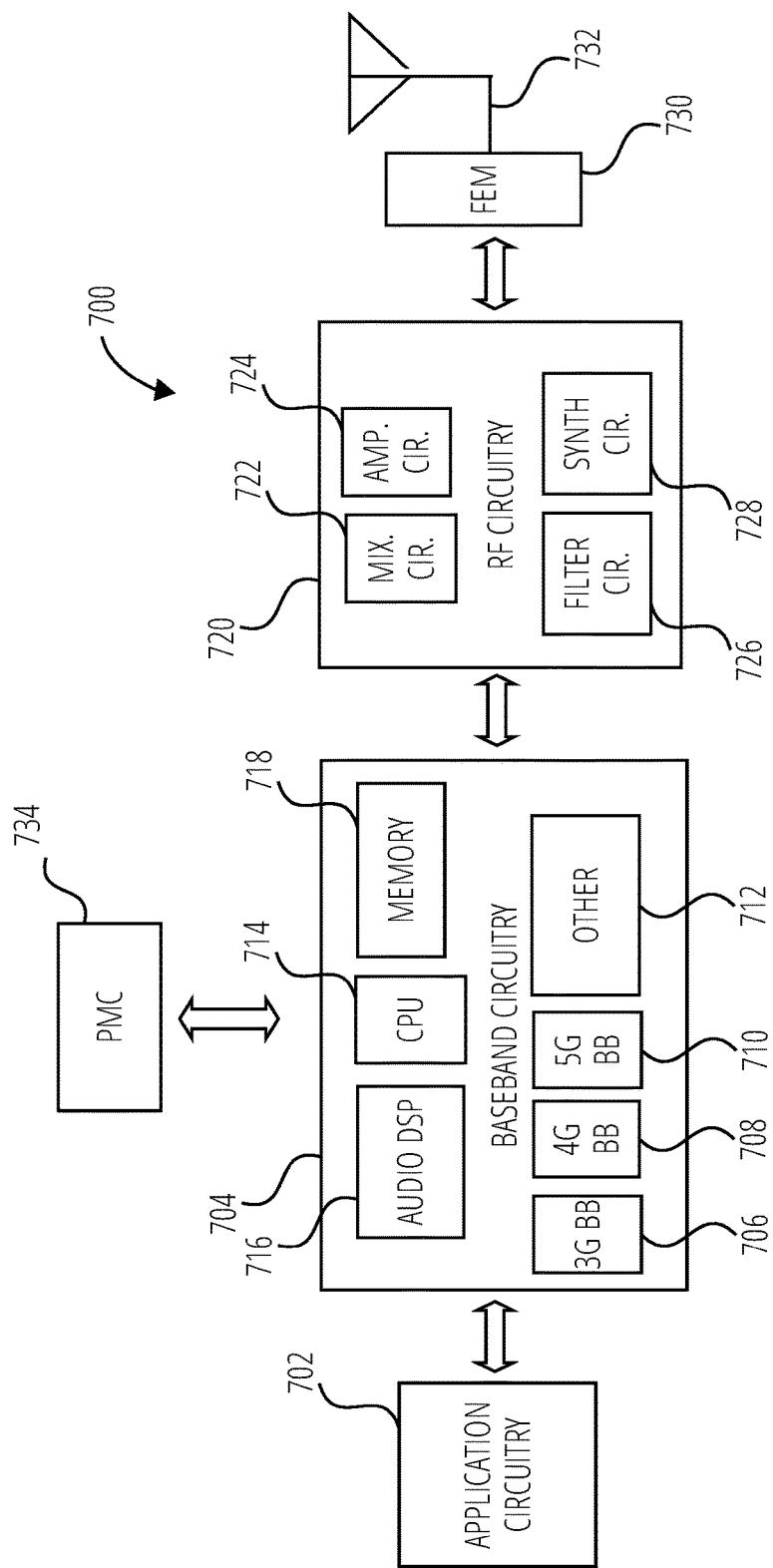
FIG. 7 illustrates a device in accordance with one embodiment.

FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission.

In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
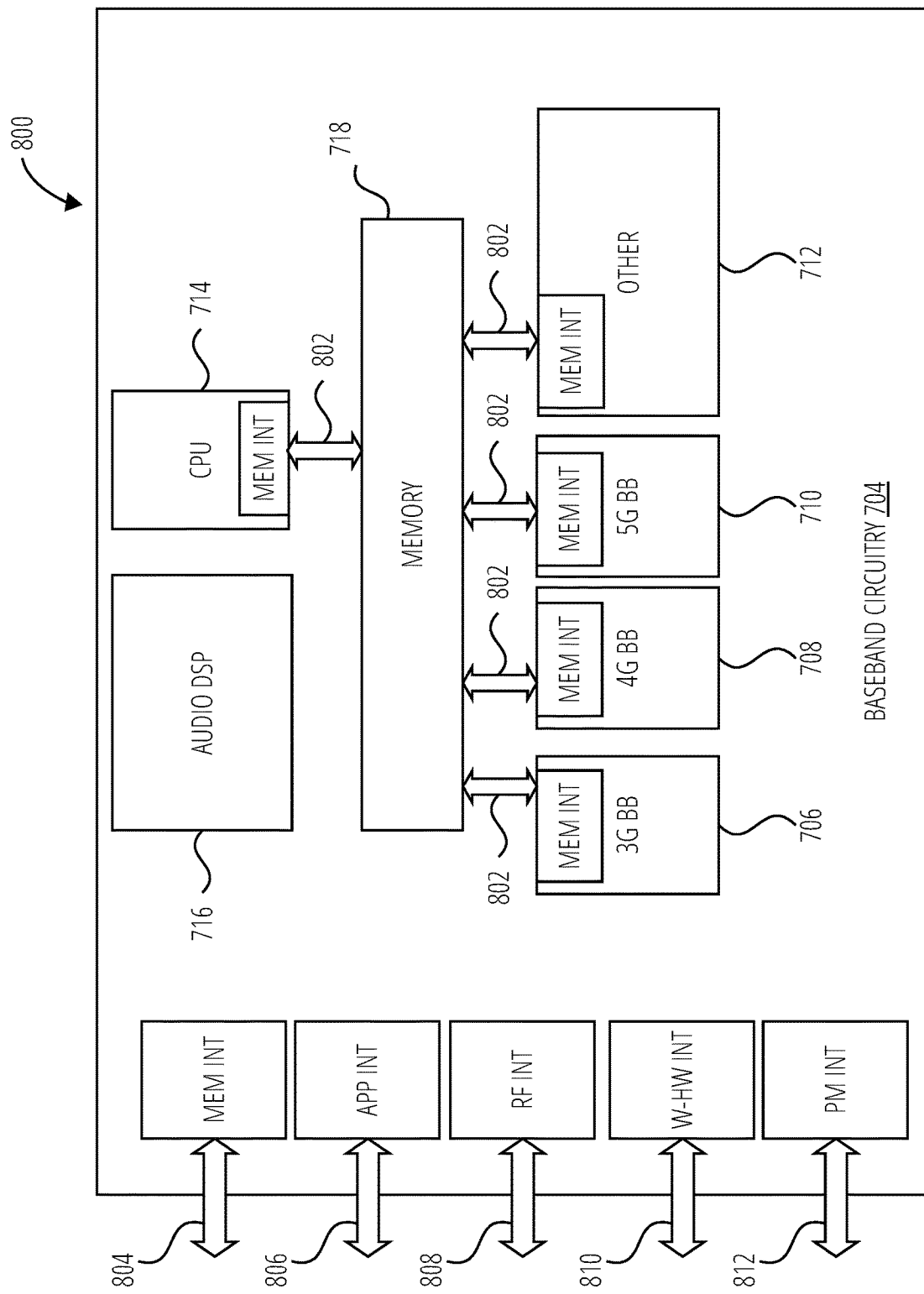
FIG. 8 illustrates an example interfaces in accordance with one embodiment.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
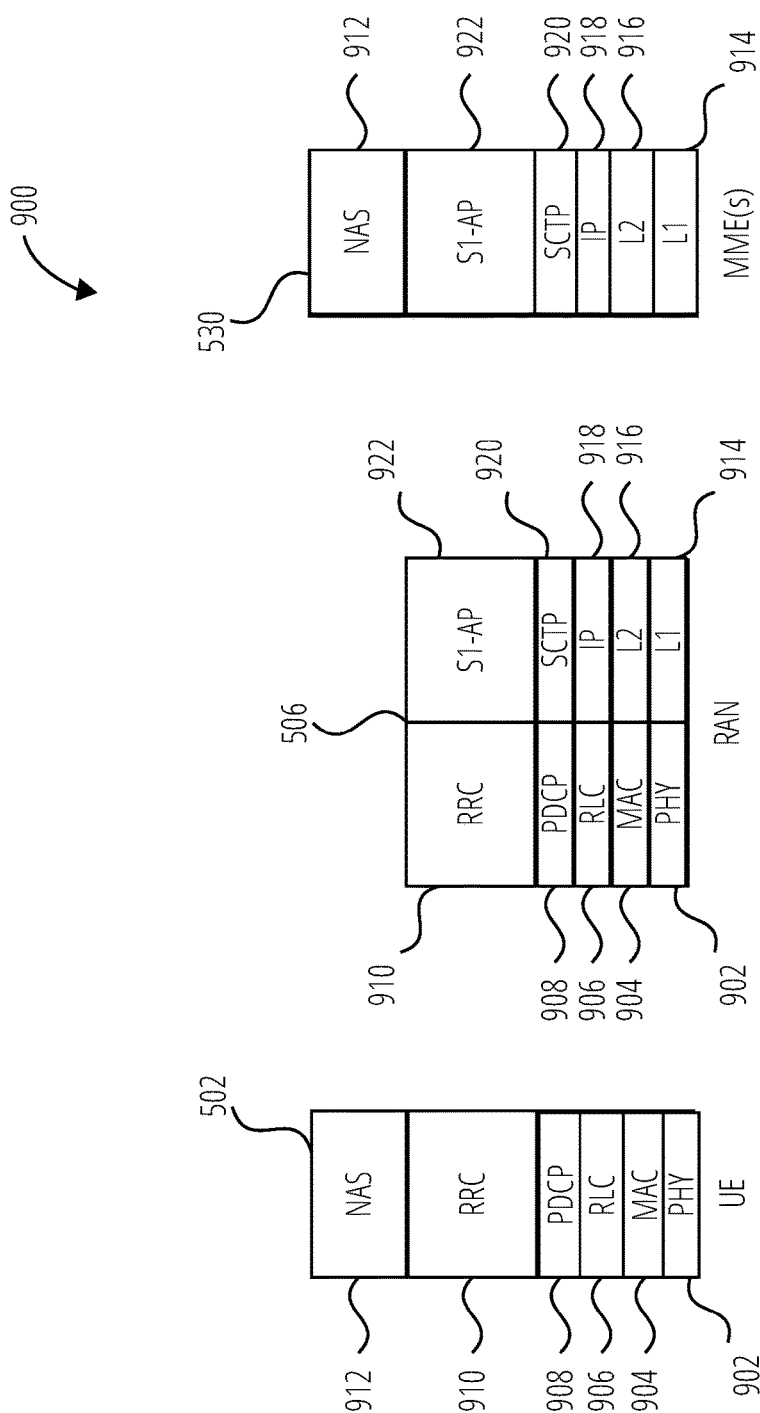
FIG. 9 illustrates a control plane in accordance with one embodiment.

FIG. 9 is an illustration of a control plane protocol stack in accordance with some embodiments. In this embodiment, a control plane 900 is shown as a communications protocol stack between the UE 502 (or alternatively, the UE 504), the RAN 506 (e.g., the macro RAN node 518 and/or the LP RAN node 520), and the MME(s) 530.

A PHY layer 902 may transmit or receive information used by the MAC layer 904 over one or more air interfaces. The PHY layer 902 may further perform link adaptation or adaptive modulation and coding (AMC), power control, cell search (e.g., for initial synchronization and handover purposes), and other measurements used by higher layers, such as an RRC layer 910. The PHY layer 902 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 904 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 906 may operate in a plurality of modes of operation, including: Transparent Mode (TM), Unacknowledged Mode (UM), and Acknowledged Mode (AM). The RLC layer 906 may execute transfer of upper layer protocol data units (PDUs), error correction through automatic repeat request (ARQ) for AM data transfers, and concatenation, segmentation and reassembly of RLC SDUs for UM and AM data transfers. The RLC layer 906 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 908 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 910 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 502 and the RAN 506 may utilize a Uu interface (e.g., an LTE-Uu interface) to exchange control plane data via a protocol stack comprising the PHY layer 902, the MAC layer 904, the RLC layer 906, the PDCP layer 908, and the RRC layer 910.

In the embodiment shown, the non-access stratum (NAS) protocols (NAS protocols 912) form the highest stratum of the control plane between the UE 502 and the MME(s) 530.

The NAS protocols 912 support the mobility of the UE 502 and the session management procedures to establish and maintain IP connectivity between the UE 502 and the P-GW 534.

The S1 Application Protocol (S1-AP) layer (S1-AP layer 922) may support the functions of the S1 interface and comprise Elementary Procedures (EPs). An EP is a unit of interaction between the RAN 506 and the CN 528. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 920) may ensure reliable delivery of signaling messages between the RAN 506 and the MME(s) 530 based, in part, on the IP protocol, supported by an IP layer 918. An L2 layer 916 and an L1 layer 914 may refer to communication links (e.g., wired or wireless) used by the RAN node and the MME to exchange information.

The RAN 506 and the MME(s) 530 may utilize an S1-MME interface to exchange control plane data via a protocol stack comprising the L1 layer 914, the L2 layer 916, the IP layer 918, the SCTP layer 920, and the S1-AP layer 922.

Figure 10:
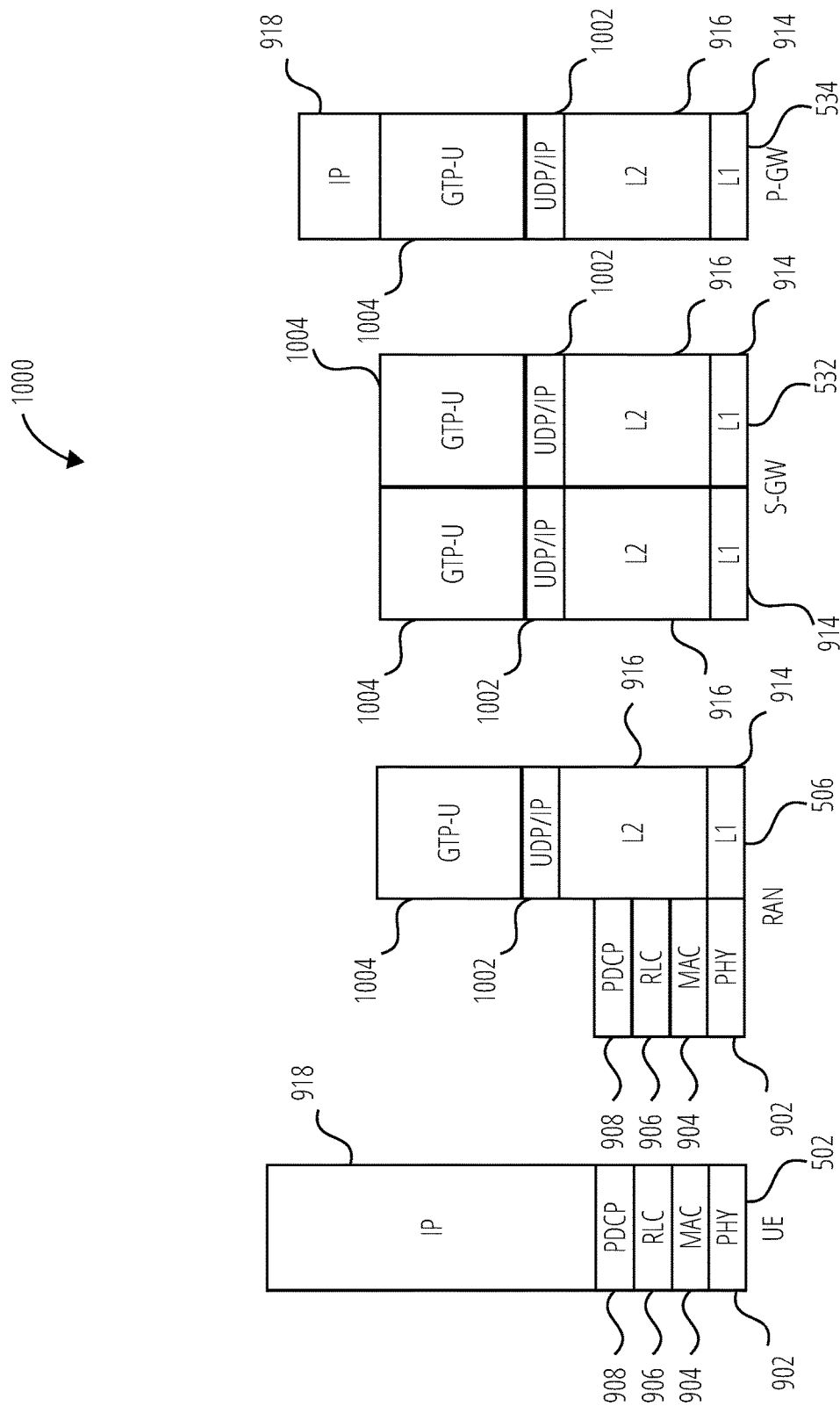
FIG. 10 illustrates a user plane in accordance with one embodiment.

FIG. 10 is an illustration of a user plane protocol stack in accordance with some embodiments. In this embodiment, a user plane 1000 is shown as a communications protocol stack between the UE 502 (or alternatively, the UE 504), the RAN 506 (e.g., the macro RAN node 518 and/or the LP RAN node 520), the S-GW 532, and the P-GW 534. The user plane 1000 may utilize at least some of the same protocol layers as the control plane 900. For example, the UE 502 and the RAN 506 may utilize a Uu interface (e.g., an LTE-Uu interface) to exchange user plane data via a protocol stack comprising the PHY layer 902, the MAC layer 904, the RLC layer 906, the PDCP layer 908.

The General Packet Radio Service (GPRS) Tunneling Protocol for the user plane (GTP-U) layer (GTP-U layer 1004) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1002) may provide checksums for data integrity, port numbers for addressing different functions at the source and destination, and encryption and authentication on the selected data flows. The RAN 506 and the S-GW 532 may utilize an S1-U interface to exchange user plane data via a protocol stack comprising the L1 layer 914, the L2 layer 916, the UDP/IP layer 1002, and the GTP-U layer 1004. The S-GW 532 and the P-GW 534 may utilize an S5/S8a interface to exchange user plane data via a protocol stack comprising the L1 layer 914, the L2 layer 916, the UDP/IP layer 1002, and the GTP-U layer 1004. As discussed above with respect to FIG. 9, NAS protocols support the mobility of the UE 502 and the session management procedures to establish and maintain IP connectivity between the UE 502 and the P-GW 534.

Figure 11:
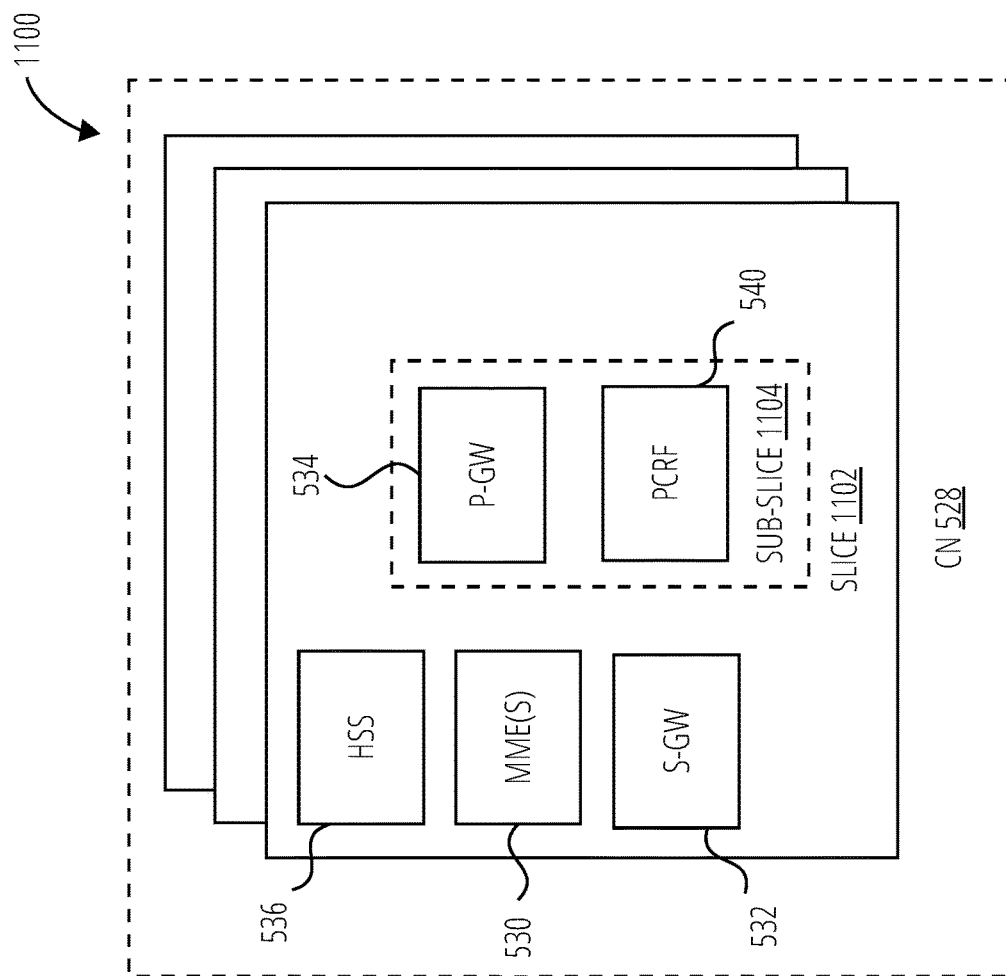
FIG. 11 illustrates components in accordance with one embodiment.

FIG. 11 illustrates components 1100 of a core network in accordance with some embodiments. The components of the CN 528 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 528 may be referred to as a network slice 1102 (e.g., the network slice 1102 is shown to include the HSS 536, tht MME(s) 530, and the S-GW 532). A logical instantiation of a portion of the CN 528 may be referred to as a network sub-slice 1104 (e.g., the network sub-slice 1104 is shown to include the P-GW 534 and the PCRF 540).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
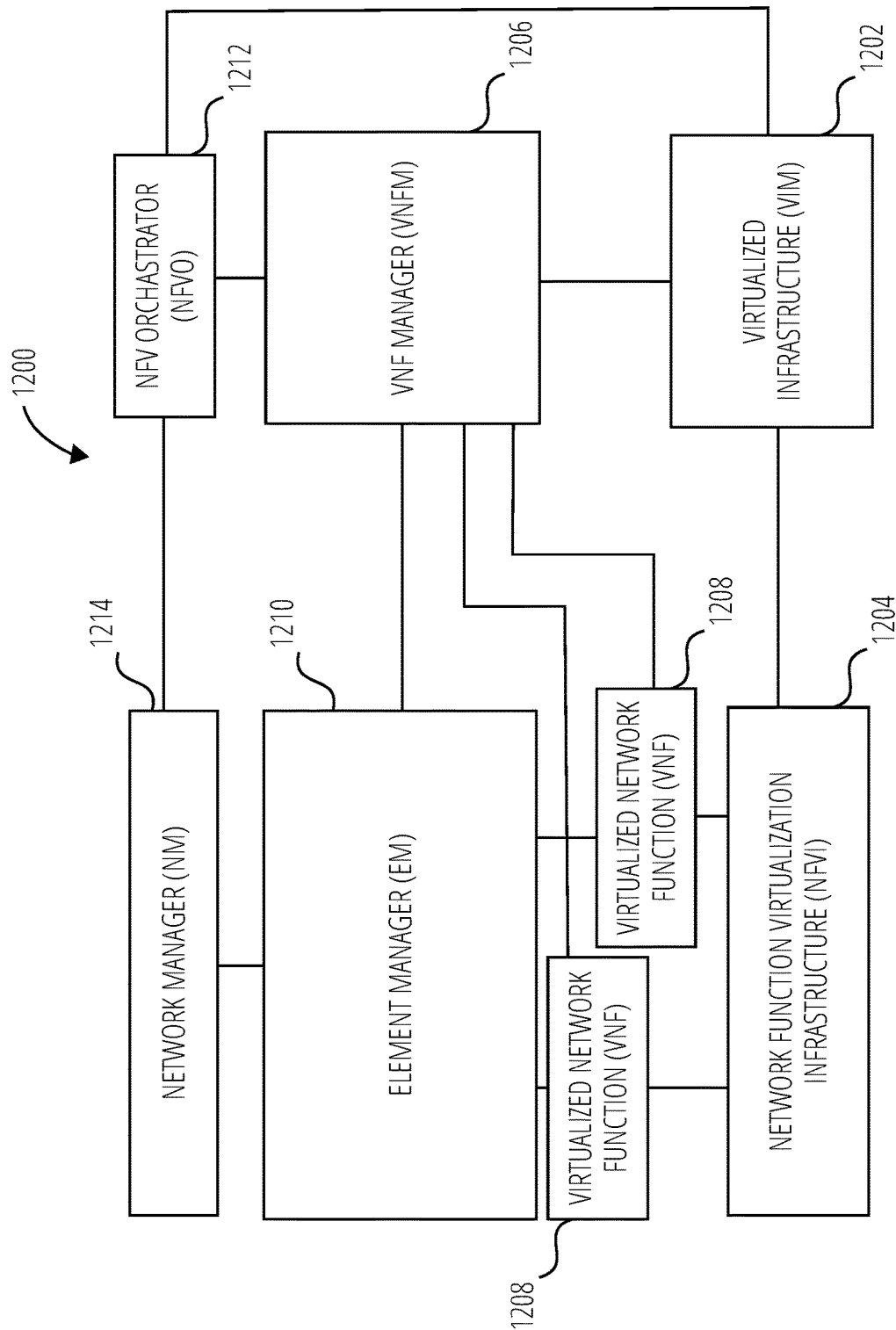
FIG. 12 illustrates a system in accordance with one embodiment.

FIG. 12 is a block diagram illustrating components, according to some example embodiments, of a system 1200 to support NFV. The system 1200 is illustrated as including a virtualized infrastructure manager (shown as VIM 1202), a network function virtualization infrastructure (shown as NFVI 1204), a VNF manager (shown as VNFM 1206), virtualized network functions (shown as VNF 1208), an element manager (shown as EM 1210), an NFV Orchestrator (shown as NFVO 1212), and a network manager (shown as NM 1214).

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1206 may manage the VNF 1208. The VNF 1208 may be used to execute EPC components/functions. The VNFM 1206 may manage the life cycle of the VNF 1208 and track performance, fault and security of the virtual aspects of VNF 1208. The EM 1210 may track the performance, fault and security of the functional aspects of VNF 1208. The tracking data from the VNFM 1206 and the EM 1210 may comprise, for example, performance measurement (PM) data used by the VIM 1202 or the NFVI 1204. Both the VNFM 1206 and the EM 1210 can scale up/down the quantity of VNFs of the system 1200.

The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
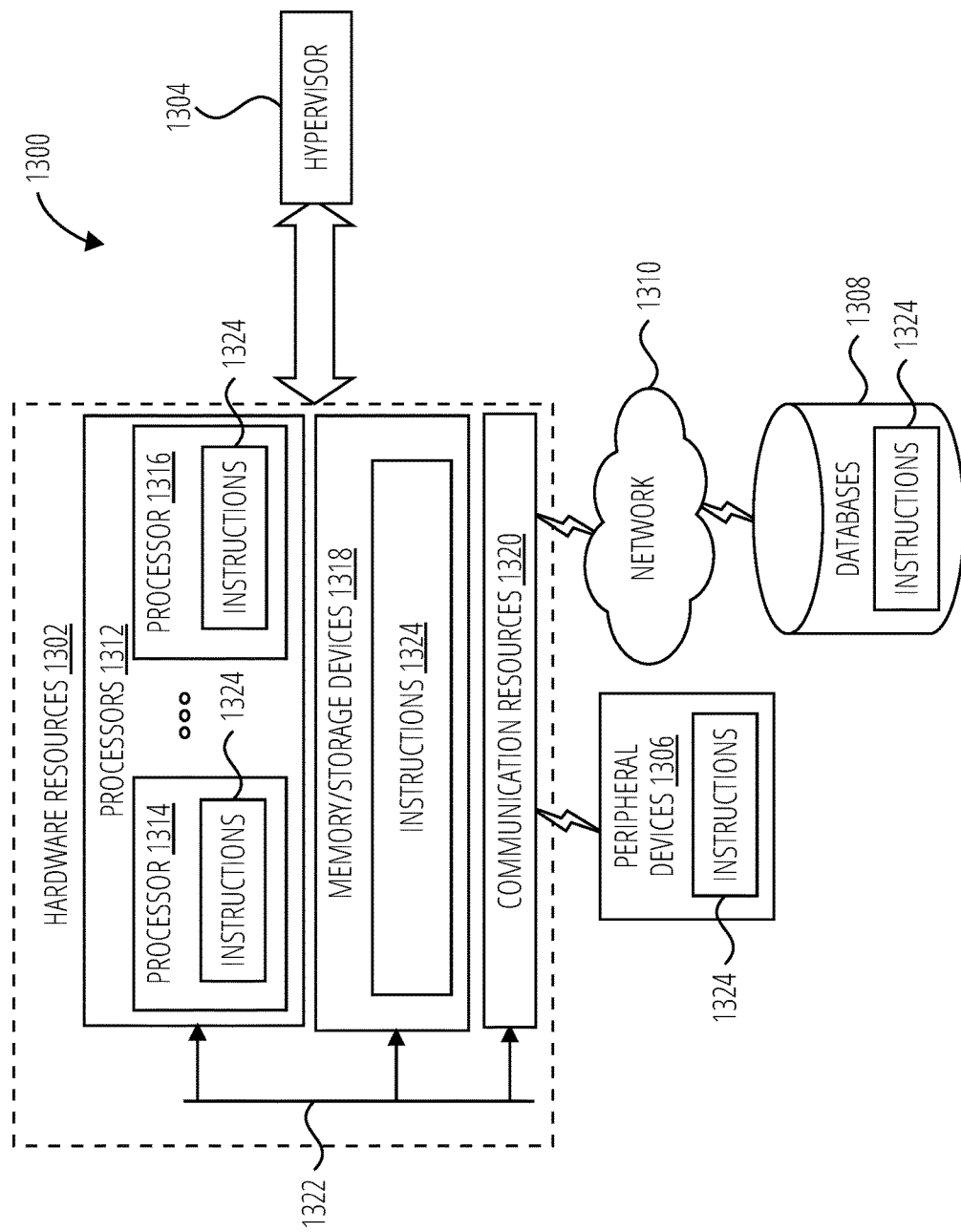
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

H. EXAMPLE SECTION

The following examples pertain to further embodiments.

Example 1A may include a method for beam detection based on L1-RSRP, wherein measurement accuracy is based on a successful beam detection probability.

Example 2A may include the method of example 1A and/or some other examples herein, wherein the successful beam detection probability is more than 90%.

Example 3A may include the method of examples 1A-2A and/or some other examples herein wherein, to achieve the required beam detection probability, one or multiple samples are needed.

Example 4A may include the method of examples 1A-3A and/or some other examples herein wherein for a Tx beam configuration, Tx beams are equally sampled in spatially domain is more prefer. e.g. Tx beam direction is equally divided by 360°/N where N is Tx beam number.

Example 5A may include the method of examples 1A-3A and/or some other examples herein wherein D=3 is defined as a baseline for CSI-RS based L1-RSRP measurement accuracy requirement.

Example 6A may include an apparatus comprising: measurement means for measuring a Layer 1 (L1)-Reference Signal Received Power (RSRP) for one or more transmission (Tx) beams of corresponding one or more Channel State Information Reference Signal (CSI-RS) resources; selection means for selection a Tx beam of the one or more measured Tx beams; comparison means for comparing the selected Tx beam with an ideal Tx beam during a period; and calculation means for calculating a successful beam detection probability.

Example 7A may include the apparatus of example 6A and/or some other examples herein, further comprising: communication means for transmitting a beam report to indicate the L1-RSRP measurements and/or the selected Tx beam when the successful beam detection probability is greater than or equal to 90%.

Example 8A may include the apparatus of examples 6A-7A and/or some other examples herein, wherein the apparatus is to be implemented in or by a user equipment (UE).

Example 9A may include an apparatus comprising means to perform one or more elements of a method described in or related to any of examples 1A-8A, or any other method or process described herein.

Example 10A may include one or more non-transitory computer-readable media comprising instructions to cause an electronic device, upon execution of the instructions by one or more processors of the electronic device, to perform one or more elements of a method described in or related to any of examples 1A-8A, or any other method or process described herein.

Example 11A may include an apparatus comprising logic, modules, or circuitry to perform one or more elements of a method described in or related to any of examples 1A-8A, or any other method or process described herein.

Example 12A may include a method, technique, or process as described in or related to any of examples 1A-8A, or portions or parts thereof.

Example 13A may include an apparatus comprising: one or more processors and one or more computer readable media comprising instructions that, when executed by the one or more processors, cause the one or more processors to perform the method, techniques, or process as described in or related to any of examples 1A-8A, or portions thereof.

Example 14A may include a signal as described in or related to any of examples 1A-8A, or portions or parts thereof.

Example 15A may include a signal in a wireless network as shown and described herein.

Example 16A may include a method of communicating in a wireless network as shown and described herein.

Example 17A may include a system for providing wireless communication as shown and described herein.

Example 18A may include a device for providing wireless communication as shown and described herein.

Example 1B is a method for beam detection by a user equipment (UE) in a wireless communication system. The method includes identifying a plurality of channel state information reference signal (CSI-RS) resources corresponding to different transmit (Tx) beams configured for measurement by the UE, measuring a layer one reference signal received power (L1-RSRP) for the plurality of CSI-RS resources, determining a selected Tx beam of the different Tx beams based on measured L1-RSRP values for the plurality of CSI-RS resources, and determining a measurement accuracy of a first L1-RSRP value corresponding to the selected Tx beam based on successful beam detection probability.

Example 2B includes the method of example 1B, wherein the CSI-RS resources configured for L1-RSRP measurement are transmitted with a density of three or more resource element (RE) per resource block (RB) per port.

Example 3B includes the method of example 2B, wherein measuring the L1-RSRP for the plurality of CSI-RS resources comprises measuring three samples of the L1-RSRP for each of the plurality CSI-RS resources.

Example 4B includes the method of example 3B, further comprising averaging the three samples corresponding to each of the plurality of CSI-RS resources.

Example 5B includes the method of example 1B, further comprising: measuring a single sample of L1-RSRP for each of the plurality CSI-RS resources; determining whether a first beam detection probability of a first candidate Tx beam based on the single sample is greater than a threshold probability value; if the first beam detection probability is greater than the threshold probability value, selecting the first candidate Tx beam as the selected Tx beam; and if the first beam detection probability is not greater than the threshold probability value: measuring multiple samples of L1-RSRP for each of the plurality CSI-RS resources; and in response to determining that a second beam detection probability of a second candidate Tx beam based on the multiple samples is greater than the threshold probability value, selecting the second candidate Tx beam as the selected Tx beam.

Example 6B includes the method of example 5B, further comprising averaging the multiples samples corresponding to respective CSI-RS resources.

Example 7B includes the method of example 5B, wherein the threshold probability value is about 90%.

Example 8B includes the method of example 5B, wherein the multiple samples comprises three or more samples to achieve the successful beam detection probability.

Example 9B includes the method of example 1B, wherein determining the selected Tx beam comprises: determining a largest L1-RSRP of the measured L1-RSRP values for the plurality of CSI-RS resources, the largest L1-RSRP corresponding to a candidate Tx beam; comparing the candidate Tx beam to a predetermined Tx beam in a measurement period; and based on the comparison, calculating the successful beam detection probability.

Example 10B includes the method of example 1B, wherein for a Tx beam configuration, equally sampling the different Tx beams in a spatial domain.

Example 11B includes the method of example 10B, further comprising equally dividing Tx beam directions of the different Tx beams by 360°/N, where N is a Tx beam number.

Example 12B includes the method of example 1B, further comprising generating a report including at least one of the first L1-RSRP value and an indication of the selected Tx beam.

Example 13B is a method for a node in a wireless network to configure channel state information reference signal (CSI-RS) reporting based on layer one reference signal received power (L1-RSRP), the method comprising: generating configuration information indicating CSI-RS resources configured for measurement by a user equipment (UE); transmitting the CSI-RS resources configured for L1-RSRP measurement with a density of three or more resource element (RE) per resource block (RB) per port; and processing a report from the UE corresponding to L1-RSRP measurements over a measurement period based on the CSI-RS resources.

Example 14B includes the method of example 13B, further comprising configuring the UE to average at least three samples of the L1-RSRP for each of the plurality of CSI-RS resources.

Example 15B includes the method of example 13B, providing a Tx beam configuration wherein Tx beams corresponding to the CSI-RS resources are equally sampled in a spatial domain.

Example 16B includes the method of example 15B, further comprising equally dividing Tx beam directions of the Tx beams by 360°/N, where N is a Tx beam number.

Example 17B includes the method of example 1B3, further comprising instructing the UE to perform CSI-RS based candidate beam detection with a successful beam detection probability of more than 90%.

Example 18B is an apparatus for a user equipment (UE) for beam detection in a wireless communication system. The apparatus includes a processor, and a memory storing instructions that, when executed by the processor, configure the apparatus to: identify a plurality of channel state information reference signal (CSI-RS) resources corresponding to different transmit (Tx) beams configured for measurement by the UE; measure a layer one reference signal received power (L1-RSRP) for the plurality of CSI-RS resources; determine a selected Tx beam of the different Tx beams based on measured L1-RSRP values for the plurality of CSI-RS resources; and determine a measurement accuracy of a first L1-RSRP value corresponding to the selected Tx beam based on successful beam detection probability.

Example 19B includes the apparatus of example 18B, wherein the CSI-RS resources configured for L1-RSRP measurement are transmitted with a density of three or more resource element (RE) per resource block (RB) per port.

Example 20B includes the apparatus of example 19B, wherein to measure the L1-RSRP for the plurality of CSI-RS resources comprises measuring three samples of the L1-RSRP for each of the plurality CSI-RS resources.

Example 21B includes the apparatus of example 20B, wherein the instructions further configure the apparatus to average the three samples corresponding to each of the plurality of CSI-RS resources.

Example 22B includes the apparatus of example 18B, wherein the instructions further configure the apparatus to: measure a single sample of L1-RSRP for each of the plurality CSI-RS resources; determine whether a first beam detection probability of a first candidate Tx beam based on the single sample is greater than a threshold probability value; if the first beam detection probability is greater than the threshold probability value, select the first candidate Tx beam as the selected Tx beam; and if the first beam detection probability is not greater than the threshold probability value: measure multiple samples of L1-RSRP for each of the plurality CSI-RS resources; and in response to determining that a second beam detection probability of a second candidate Tx beam based on the multiple samples is greater than the threshold probability value, select the second candidate Tx beam as the selected Tx beam.

Example 23B includes the apparatus of example 22B, wherein the instructions further configure the apparatus to average the multiples samples corresponding to respective CSI-RS resources.

Example 24B includes the apparatus of example 22B, wherein the threshold probability value is about 90%.

Example 25B includes the apparatus of example 22V, wherein the multiple samples comprises three or more samples to achieve the successful beam detection probability.

Example 26B includes the apparatus of example 18B, wherein to determine the selected Tx beam comprises: determine a largest L1-RSRP of the measured L1-RSRP values for the plurality of CSI-RS resources, the largest L1-RSRP corresponding to a candidate Tx beam; compare the candidate Tx beam to a predetermined Tx beam in a measurement period; and based on the comparison, calculate the successful beam detection probability.

Example 27B includes the apparatus of example 18B, wherein for a Tx beam configuration, the instructions further configure the apparatus to equally sample the different Tx beams in a spatial domain.

Example 28B includes the apparatus of example 27B, wherein the instructions further configure the apparatus to equally divide Tx beam directions of the different Tx beams by 360°/N, where N is a Tx beam number.

Example 29B includes the apparatus of example 18B, wherein the instructions further configure the apparatus to generate a report including at least one of the first L1-RSRP value and an indication of the selected Tx beam.

Example 30B is a non-transitory computer-readable storage medium, the computer-readable storage medium including instructions that when executed by a processor of a node in a wireless network, cause the process to configure channel state information reference signal (CSI-RS) reporting based on layer one reference signal received power (L1-RSRP), the instructions to configure the processor to: generate configuration information indicating CSI-RS resources configured for measurement by a user equipment (UE); transmit the CSI-RS resources configured for L1-RSRP measurement with a density of three or more resource element (RE) per resource block (RB) per port; and process a report from the UE corresponding to L1-RSRP measurements over a measurement period based on the CSI-RS resources.

Example 31B includes the computer-readable storage medium of example 30B, wherein the instructions further configure the processor to configure the UE to average at least three samples of the L1-RSRP for each of the plurality of CSI-RS resources.

Example 32B includes the computer-readable storage medium of example 30B, wherein the instructions further configure the processor to provide a Tx beam configuration wherein Tx beams corresponding to the CSI RS resources are equally sampled in a spatial domain.

Example 33B includes the computer-readable storage medium of example 32B, wherein the instructions further configure the processor to equally divide Tx beam directions of the Tx beams by 360°/N, where N is a Tx beam number.

Example 34B includes the computer-readable storage medium of example 30B, wherein the instructions further configure the processor to instruct the UE to perform CSI-RS based candidate beam detection with a successful beam detection probability of more than 90%.

Example 35B is a computing apparatus including a processor and a memory storing instructions that, when executed by the processor, configure the apparatus to perform the method of any of examples 1B-17B.

Example 36B is a non-transitory computer-readable storage medium including instructions that, when processed by a computer, configure the computer to perform the method of any of examples 1B-17B.

Example 37B is an apparatus comprising: measurement means for measuring a layer 1 reference signal received power (L1-RSRP) for one or more transmission (Tx) beams of corresponding one or more channel state information reference signal (CSI-RS) resources; selection means for selection a Tx beam of the one or more measured Tx beams; comparison means for comparing the selected Tx beam with an ideal Tx beam during a period; and calculation means for calculating a successful beam detection probability.

Example 38B includes the apparatus of example 37B, wherein the CSI-RS resources are transmitted with a density of three or more resource element (RE) per resource block (RB) per port.

Example 39B includes the apparatus of example 37B, wherein the measurement means measures three samples of the L1-RSRP for each of the CSI-RS resources.

Example 40B includes the apparatus of example 37B, further comprising communication means for transmitting a beam report to indicate the L1-RSRP measurements and/or the selected Tx beam when the successful beam detection probability is greater than or equal to 90%.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A non-transitory computer-readable storage medium, the computer-readable storage medium including instructions that when executed by a processor of a node in a wireless network, cause the process to configure channel state information reference signal (CSI-RS) reporting based on layer one reference signal received power (L1-RSRP), the instructions to configure the processor to:
    generate configuration information indicating CSI-RS resources configured for measurement by a user equipment (UE);
    transmit the CSI-RS resources configured for L1-RSRP measurement with a density of three or more resource element (RE) per resource block (RB) per port;
    configure the UE to average at least three samples of the L1-RSRP for each of the CSI-RS resources; and
    process a report from the UE corresponding to L1-RSRP measurements over a measurement period based on the CSI-RS resources.

2. The non-transitory computer-readable storage medium of claim 1, wherein the instructions further configure the processor to provide a transmit (Tx) beam configuration wherein Tx beams corresponding to the CSI-RS resources are equally sampled in a spatial domain.

3. The non-transitory computer-readable storage medium of claim 2, wherein the instructions further configure the processor to equally divide Tx beam directions of the Tx beams by 360°/N, where N is a Tx beam number.

4. The non-transitory computer-readable storage medium of claim 1, wherein the instructions further configure the processor to instruct the UE to perform CSI-RS based candidate beam detection with a successful beam detection probability of more than 90%.

5. A base station comprising:
    a processor configured to:
        generate configuration information indicating channel state information reference signal (CSI-RS) resources configured for measurement by a user equipment (UE);
        transmit the CSI-RS resources configured for layer one reference signal received power (L1-RSRP) measurement with a density of three or more resource element (RE) per resource block (RB) per port;
        configure the UE to average at least three samples of the L1-RSRP for each of the CSI-RS resources; and
        process a report from the UE corresponding to L1-RSRP measurements over a measurement period based on the CSI-RS resources; and
    memory to store the report from the UE.

6. The base station of claim 5, wherein the processor is further configured to provide a transmit (Tx) beam configuration wherein Tx beams corresponding to the CSI-RS resources are equally sampled in a spatial domain.

7. The base station of claim 6, wherein the processor is further configured to equally divide Tx beam directions of the Tx beams by 3607N, where N is a Tx beam number.

8. The base station of claim 5, wherein the processor is further configured to instruct the UE to perform CSI-RS based candidate beam detection with a successful beam detection probability of more than 90%.

9. A method for a node in a wireless network to configure channel state information reference signal (CSI-RS) reporting based on layer one reference signal received power (L1-RSRP), the method comprising:
    generating configuration information indicating CSI-RS resources configured for measurement by a user equipment (UE);
    transmitting the CSI-RS resources configured for L1-RSRP measurement with a density of three or more resource element (RE) per resource block (RB) per port;

configuring the UE to average at least three samples of the L1-RSRP for each of the CSI-RS resources; and processing a report from the UE corresponding to L1-RSRP measurements over a measurement period based on the CSI-RS resources.

10. The method of claim 9, further comprising providing a transmit (Tx) beam configuration wherein Tx beams corresponding to the CSI-RS resources are equally sampled in a spatial domain.

11. The method of claim 10, further comprising equally dividing Tx beam directions of the Tx beams by 360°/N, where N is a Tx beam number.

12. The method of claim 9, further comprising instructing the UE to perform CSI-RS based candidate beam detection with a successful beam detection probability of more than 90%.

* * * * *